(12) United States Patent
Graetzel et al.

(10) Patent No.: US 6,936,143 B1
(45) Date of Patent: Aug. 30, 2005

(54) TANDEM CELL FOR WATER CLEAVAGE BY VISIBLE LIGHT

(75) Inventors: Michael Graetzel, St. Sulpice (CH); Jan Augustynski, Geneva (CH)

(73) Assignee: Ecole Polytechnique Federale de Lausanne, Lausanne (CH)

(*) Notice: Subject to any disclaimer, the term of this patent is extended or adjusted under 35 U.S.C. 154(b) by 0 days.

(21) Appl. No.: 10/030,036

(22) PCT Filed: Apr. 7, 2000

(86) PCT No.: PCT/EP00/06350

§ 371 (c)(1),
(2), (4) Date: Jun. 10, 2002

(87) PCT Pub. No.: WO01/02624

PCT Pub. Date: Jan. 11, 2001

(30) Foreign Application Priority Data

Jul. 5, 1999 (EP) .......................................... 99810592

(51) Int. Cl.[7] ............................. C25B 9/00; C25B 11/00
(52) U.S. Cl. ....................... 204/242; 204/265; 204/278; 204/270; 204/258; 204/290.01
(58) Field of Search ................. 204/242, 265–266, 204/290.01, 277–278, 258, 270

(56) References Cited

U.S. PATENT DOCUMENTS

| | | | |
|---|---|---|---|
| 3,925,212 A | | 12/1975 | Tcherner |
| 4,090,933 A | * | 5/1978 | Nozik ........................ 205/340 |
| 4,381,978 A | * | 5/1983 | Gratzel et al. .............. 205/340 |
| 4,466,869 A | | 8/1984 | Ayers |
| 4,643,817 A | * | 2/1987 | Appleby ...................... 204/242 |
| 4,793,910 A | * | 12/1988 | Smotkin et al. ............ 204/268 |

OTHER PUBLICATIONS

M. Gratzel, "Photoelectrochemical solar energy conversion by dye sensitization" Abstract; Future Generation Photovoltaic Technologies. First NREL Conference, Denver, Co. Mar. 24–26, 1997; No. 404, pp. 119–127, *AIP Proceedings, 1997*.

S. Borman "Hydrogen from water and light" *Chemical and Engineering News, US, American Chemical Society, Coloumbus,* vol. 76(18), pp. 11–12.

* cited by examiner

*Primary Examiner*—Donald R. Valentine
(74) *Attorney, Agent, or Firm*—Townsend and Townsend and Crew LLP

(57) ABSTRACT

A tandem cell or photoelectrochemical system for the cleavage of water to hydrogen and oxygen by visible light has two superimposed photocells, both cells being connected electrically. The photoactive material in the top cell is a semiconducting oxide placed in contact with an aqueous solution. This semiconducting oxide absorbs the blue and green part of the solar emission spectrum of a light source or light sources and generates with the energy collected oxygen and protons from water. The not absorbed yellow and red light transmits the top cell and enters a second photocell, the bottom cell, which is mounted, in the direction of the light behind, preferably directly behind the top cell. The bottom cell includes a dye-sensitized mesoporous photovoltaic film. The bottom cell converts the yellow, red and near infrared portion of the sunlight to drive the reduction of the protons, which are produced in the top cell during the photo catalytic water oxidation process, to hydrogen.

8 Claims, 3 Drawing Sheets

Incident Photon to Current Conversion Efficiencies Obtained with Various Sensitizers L' = 4,4',4''-tricarboxy-2,2', 6',2''-terpyridine L = 4,4'-dicarboxy-2,2'-bipyridine

TANDEM CELL FOR WATER CLEAVAGE BY VISIBLE LIGHT

BACKGROUND OF THE INVENTION

The invention is related to a photoelectrochemical system for the cleavage of water to hydrogen and oxygen.

Previous systems that accomplish the direct splitting of water by visible light with a comparably high efficiency employ very expensive single crystal semiconductor materials. For details see O. Khaselev and J. Turner, Science 280, 1998, 455. Therefore these previous systems are not suitable for practical applications to produce hydrogen and oxygen from sunlight.

SUMMARY OF THE INVENTION

According to the invention a photoelectrochemical system is characterized by a photoactive material in the top cell that is a semiconducting oxide placed in contact with an aqueous solution, the oxide absorbing the blue and green part of the solar emission spectrum to generate oxygen and protons from water and transmitting the yellow and red light to a second photocell mounted behind the top cell and composed of a dye-sensitized mesoporous photovoltaic film. The bottom cell converts the yellow, red and near infrared portion of the sunlight to drive the reduction of the protons, produced in the top cell during the photo catalytic water oxidation process, to hydrogen. The improved photoelectrochemical system provides for photoelectrochemical tandem cells that show a considerably high efficiency. Further the photoelectrochemical system can be manufactured at relatively low cost. A further advantage of the present invention is that seawater can be used for the process instead of pure water.

In the following the invention will now be described by way of example and with reference to the accompanying drawings.

DESCRIPTION OF THE PREFERRED EMBODIMENTS

Figure 1:
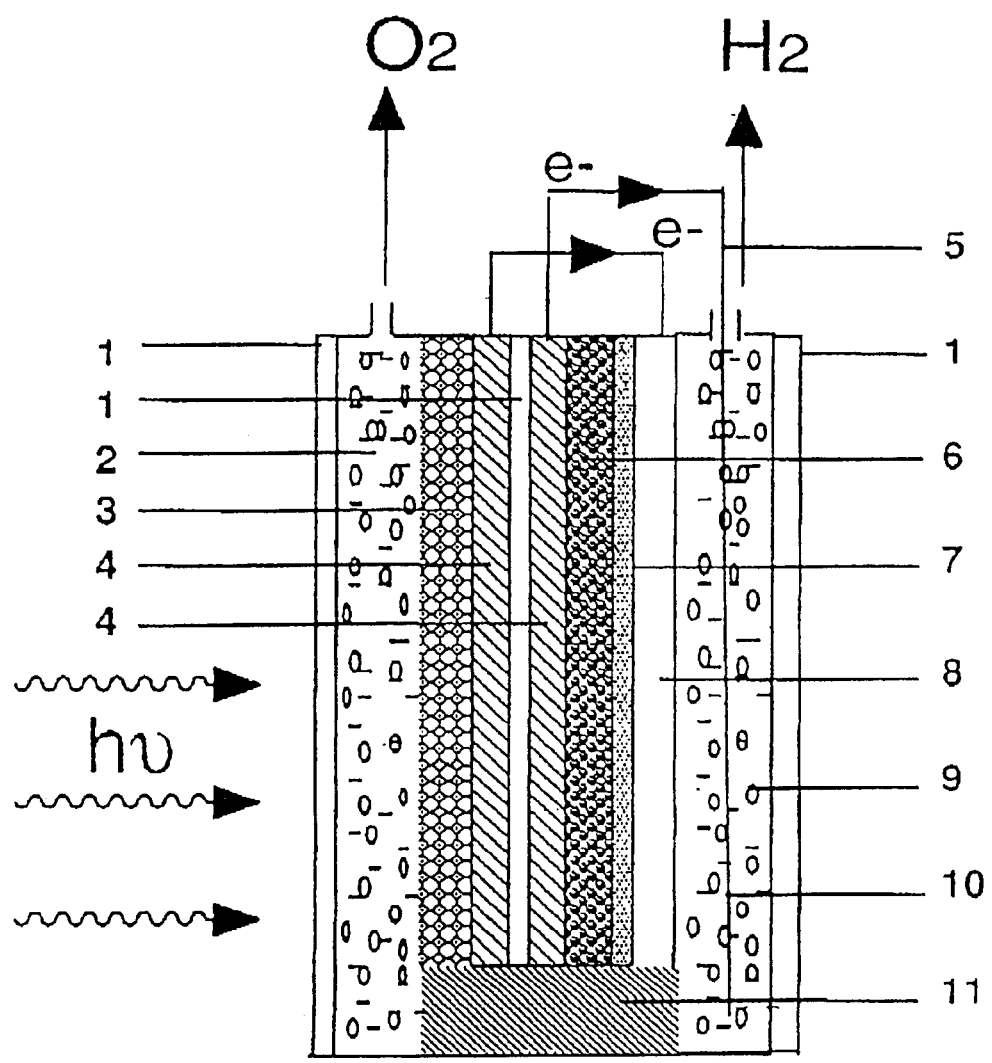
FIG. 1 shows a schematic drawing of the water photolysis device that is an object of the present invention.

A schematic representation of the water photolysis device that is an object of the present invention is illustrated in FIG. 1. The device consists of two photo systems connected in series. The cell on the left contains the aqueous electrolyte that is subjected to water photolysis. The electrolyte is composed of water as a solvent to which an electrolyte has been added for ionic conduction. Saline seawater can also be used as a water source, in which case the addition of electrolyte becomes superfluous. Light enters from the left side of the cell through a glass window (1). After traversing the electrolyte (2) it impinges on the back wall of the cell constituted by a mesoporous semiconductor film composed of an oxide such as $WO_3$ or $Fe_2O_3$ (3). The latter is deposited onto a transparent conducting oxide film (4) made from a material such as fluorine-doped tin dioxide that serves as current collector which is deposited on the glass sheet (1). The oxide absorbs the blue and green part of the solar spectrum while the yellow and red light is transmitted through it. The yellow and red part of the solar spectrum is captured by a second cell mounted behind the back wall of the first cell. The second cell contains a dye-sensitized mesoporous $TiO_2$ film. It functions as a light-driven electric bias increasing the electrochemical potential of the electrons that emerge from the $WO_3$ film under illumination to render the reduction of water to hydrogen possible. It consists of a transparent conducting oxide film (4) deposited on the back side of the glass sheet (1) constituting the back wall of the first cell. The conducting oxide film is covered by the dye-derivatized nanocrystalline titania film (6). The latter is in contact with the organic redox electrolyte (7) and the counter electrode (8) consisting of a glass which is rendered conductive on the side of the organic electrolyte by deposition of a transparent conductive oxide layer. Behind the counterelectrode there is a second compartment (9) containing an aqueous electrolyte of the same composition as in the front compartment (2). Hydrogen is evolved at the cathode (10) which is immersed in this second electrolyte compartment. The two electrolyte compartments (2) and (10) have the same composition and are separated by an ion-conducting membrane or a glass frit (11).

The following is a specific embodiment of such a tandem device achieving the direct cleavage of water into hydrogen and oxygen by visible light. A thin film of nanocrystalline tungsten trioxide absorbs the blue part of the solar spectrum.

$$WO_3 + h\nu \Rightarrow WO_3 \ (e-, h^+)$$

The valence band holes ($h^+$) created by band gap excitation of the oxide serve to oxidize water forming oxygen and protons:

$$4h^+ + H_2O \Rightarrow O_2 + 4H^+$$

while the conduction band electrons are collected on the conducting glass support forming the back wall of the first photocell. From there on they are fed into the second photocell that consists of a dye-sensitized nanocrystalline $TiO_2$ film. The latter is mounted directly behind the $WO_3$ film capturing the green and red part of the solar spectrum that is transmitted through the top electrode. The role of the second photocell is merely that of a photo-driven bias. The electrochemical potential of the electrons is sufficiently increased by passing through the second photocell that they can reduce the protons produced during water oxidation to hydrogen.

$$4H^+ + 4e^- \Rightarrow 2H_2$$

The overall reaction corresponds to the splitting of water by visible light.

$$H_2O \Rightarrow H_2 + 0.5\ O_2$$

Semiconducting oxides, such as $WO_3$ and $Fe_2O_3$, are the materials of choice for the photo-anode as they are stable under operation and resistant to both dark and photo corrosion. Tungsten trioxide and ferric oxide are so far the only known and readily available oxide semiconductors that are capable of producing oxygen using visible light. The electrons generated in the oxide are collected by the conducting glass and are subsequently fed into a second photocell that is placed directly behind the oxide film. The photoactive element of this second cell is a dye-sensitized mesoporous $TiO_2$ capturing the yellow and red light that is transmitted through the oxide electrode. It serves as a photo-driven bias increasing the electrochemical potential of the photoelectrons produced by band gap excitation of the oxide to tender reduction of water to hydrogen feasible.

Figure 2:
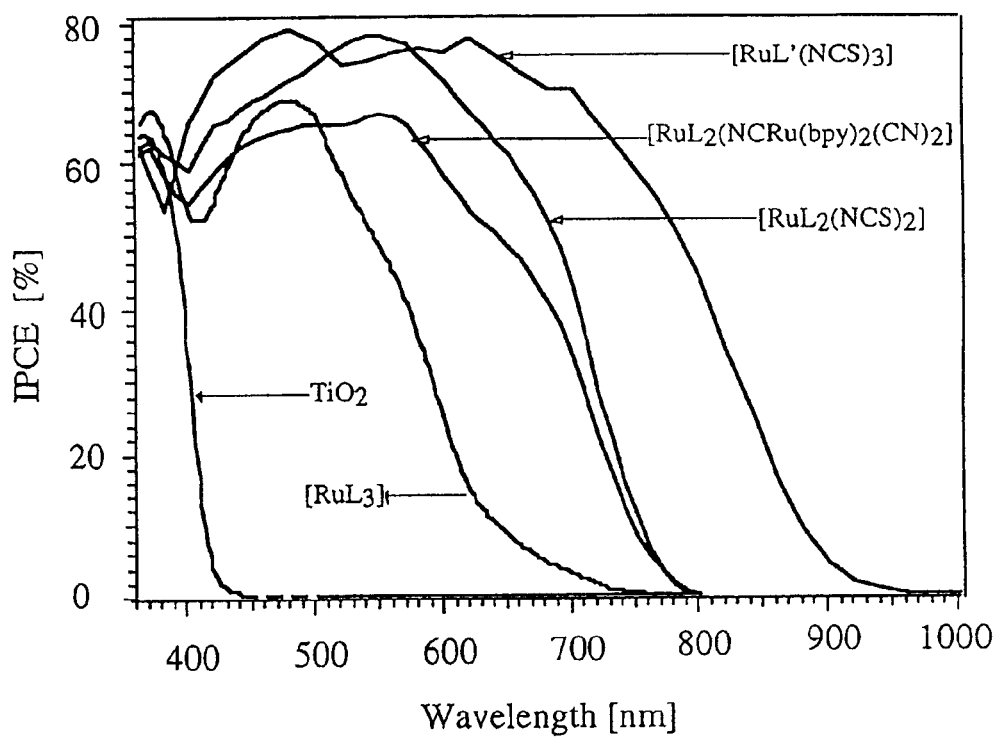
FIG. 2 shows the spectral dependency of the photon-to-electric current conversion achieved with the sensitized $TiO_2$ films for several ruthenium complexes; it shows the incident photon-to-current conversion efficiencies obtained with various sensitizer.

FIG. 2 presents the spectral dependency of the photon-to-electric current conversion achieved with the sensitized $TiO_2$ films for several ruthenium complexes. Very high efficiencies of current generation, exceeding 75%, are obtained. When corrected for the inevitable reflection and absorption losses in the conducting glass that serves to support the film, the yields are practically 100%. For the dyes $RuL_2(SCN)_2$ and $RuL'(SCN)_3$ the photo-response of the film extends well into the red and near infrared part of the spectrum, making these complexes an appropriate choice for the harvesting of the red and yellow part of sunlight by the second photocell in the tandem system.

Figure 3:
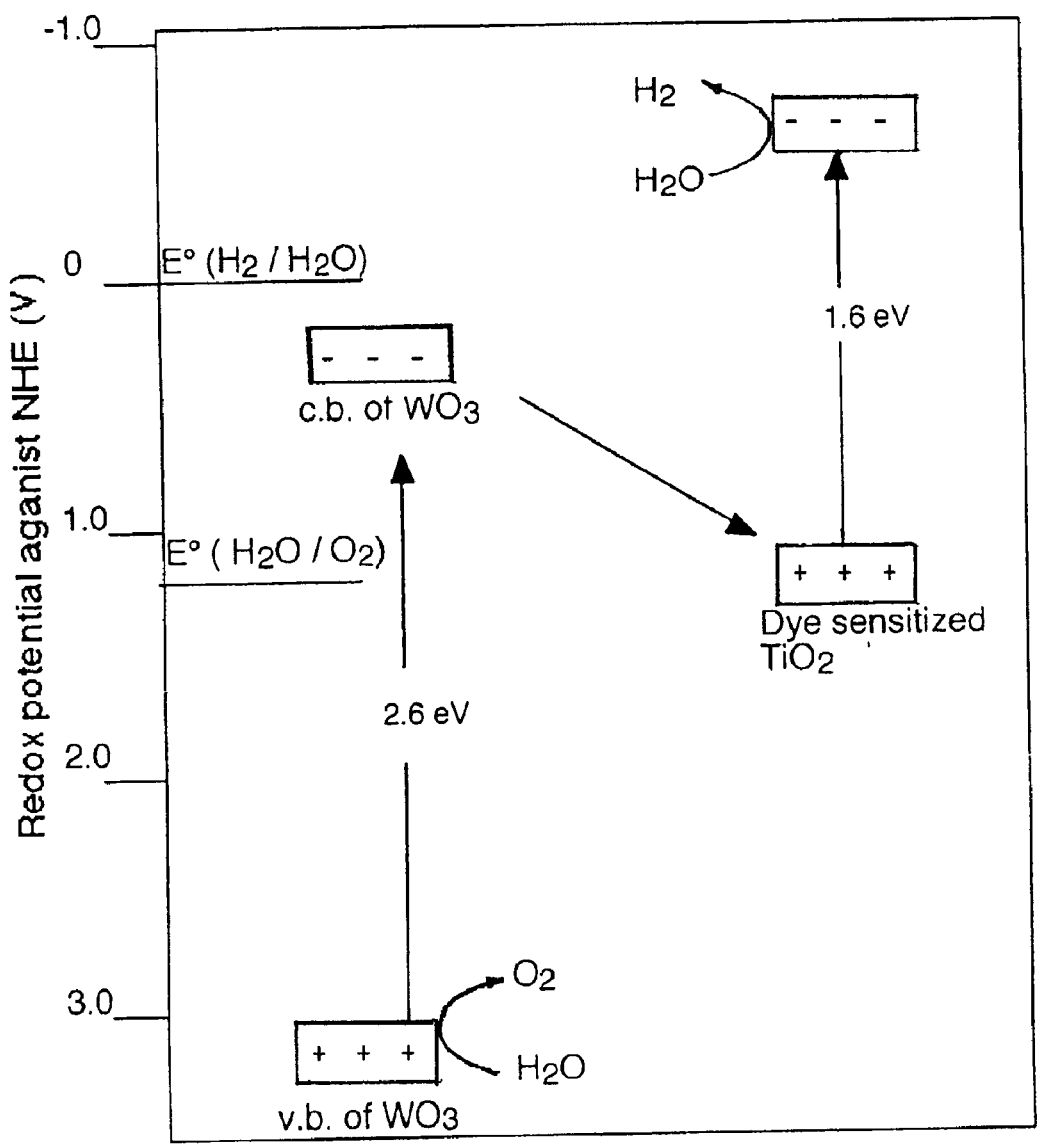
FIG. 3 shows an energy level diagram that illustrates the functioning of the tandem cell; it shows the Z scheme of biphotonic water photolysis.

The functioning of the tandem cell is further illustrated by the energy level diagram shown in FIG. 3. There is close analogy to the Z-scheme operative in the light reaction in green plants in which the two photo systems are connected in series, one affording oxidation of water to oxygen and the other generating the NADPH used in $CO_2$ fixation. At this stage of development the overall AM 1.5 solar light to chemical conversion efficiency achieved stands at 5%.

Working Example:

The preparation of transparent mesoporous $WO_3$ films of a few micron thickness has been achieved via a sol-gel type process. A colloidal $WO_3$ precursor solution was prepared first and after mixing with polyvinyl alcohol, films were deposited on a conducting glass (Nippon Sheet Glass, 10 ohm/o, fluorine-doped $SnO_2$ glass (TCO)) surface. In order to supply the bias necessary to reach the plateau photocurrent, two in series connected sensitized mesoporous $TiO_2$ injection cells were placed under the transparent $WO_3$ film.

This configuration reached a photocurrent of 3.5 $mA/cm^2$ for hydrogen generation in simulated AM 1.5 sunlight. This corresponds to an overall solar to chemical conversion efficiency of 5% for light-induced water cleavage by AM 1.5 standard sunlight.

This example illustrates the successful operation of the tandem device which is an object of the present invention. It is based on two superimposed photocells having complementary light absorption in the visible and near infrared range according to the embodiment described in the patent disclosure. Such a tandem cell accomplishes the splitting of water into hydrogen and oxygen by visible light directly rendering the use of a separate electrolysis cell superfluous. Thus it is preferred over alternative systems where traditional photovoltaic cells, such as silicon solar cells, are used in conjunction with a water electrolyzer. The present invention renders the water electrolyzer superfluous, reducing the cost of the water splitting device substantially. Apart from the cost, it is also advantageous from the operational point of view. In the conventional photoelectrolysis systems based on the combination of silicon solar cells with a water electrolyzer, several photovoltaic cells have to be connected in series to yield the voltage of about 1.7 V required for the operation of the water electrolyzer. Furthermore each of the photovoltaic cells should operate at its optimum power point to keep losses low and efficiency high. However, as the power point fluctuates according to the intensity and spectral distribution of the incident solar radiation, one needs to install a very complicated system that changes the number of in series connected cells in response to the meteorological conditions. This renders the system expensive and its operation complex. In contrast, the tandem cell described by the present invention operates at practically the same efficiency irrespective of the intensity and spectral distribution of the incident solar light.

An additional advantage of the present invention is that it uses low-cost materials, the semiconductor layers employed being made from inexpensive and readily available oxide films having a mesoporous morphology. The tandem cell exhibits an overall conversion efficiency of 5% for the photo cleavage of water into hydrogen and oxygen.

A further advantage of the present invention is that seawater can be employed instead of pure water. The salt contained in seawater produces the ionic conductivity required for operating the water cleavage device. This saves the cost for desalination of the water and for providing the electrolyte supplement which is required if pure water is employed in the electrolyzer.

The invention relates to a tandem device based on two superimposed photocells having complementary light absorption in the visible and near infrared range. Such a tandem cell accomplishes the splitting of water into hydrogen and oxygen by visible light directly, rendering the use of a separate electrolysis cell superfluous.

The tandem cell or photoelectrochemical system for the cleavage of water to hydrogen and oxygen by visible light consists of two superimposed photocells, both cells being connected electrically. The photoactive material in the top cell is a semiconducting oxide placed in contact with an aqueous solution. This semiconducting oxide absorbs the blue and green part of the solar emission spectrum of a light source or light sources and generates with the energy collected oxygen and protons from water. The not absorbed yellow and red light transmits the top cell and enters a second photocell, the bottom cell, which is mounted, in the direction of the light behind, preferably directly behind the top cell. The bottom cell includes a dye-sensitized mesoporous photovoltaic film. The bottom cell converts the yellow, red and near infrared portion of the sunlight to drive the reduction of the protons, which are produced in the top cell during the photo catalytic water oxidation process, to hydrogen.

Although the use of the photoelectrochemical system with the tandem cell according to the invention can be most advantageously used with sunlight, it can be driven with the light of any light source or light sources that emit light of the required frequencies.

The reference numbers used in FIG. 1 denominate the following:
1 Glass sheet
2 Aqueous electrolyte
3 Mesoporous oxide film, e.g. $WO_3$ $Fe_2O_3$
4 Transparent conducting oxide (TCO) film
5 Electrical connection
6 Dye-sensitized mesoporous $TiO_2$ film
7 Organic redox electrolyte for dye-sensitized solar cell (DYSC), used in tandem
8 Counter electrode for DYSC
9 Aqueous electrolyte (same composition as 2)
10 Catalytic cathode for $H_2$ evolution
11 Glass frit

What is claimed is:

1. A photoelectrochemical system for the cleavage of water to hydrogen and oxygen by visible light comprising first and second superimposed top and bottom photocells, the cells being connected electrically, a photoactive material in the top cell being a semiconducting oxide placed in contact with an aqueous solution, the oxide absorbing a blue and green part of the solar emission spectrum to generate oxygen and protons from water and transmitting a yellow and red part of the solar emission spectrum light to the bottom photocell mounted behind the top cell and composed of a sensitizer comprising a dye-sensitized porous photovoltaic film, said bottom cell converting the yellow and red parts and a near infrared part of the solar emission spectrum to drive the reduction of the protons, produced in the top cell during a photo catalytic water oxidation process, to hydrogen.

2. A photoelectrochemical system for the direct cleavage of water to hydrogen and oxygen by visible light according to claim 1 comprising two superimposed photocells, both cells being connected electrically, wherein the photoactive material present in the top photocell is a thin film of $WO_3$ or $Fe_2O_3$ deposited on a conducting substrate or conducting glass and placed in contact with an aqueous electrolyte solution, said $WO_3$ tungsten oxide or $Fe_2O_3$ iron oxide absorbing the blue and green part of the solar emission spectrum to generate oxygen and protons from water and transmitting the yellow and red light to the bottom photocell mounted behind the top photocell and composed of the dye-sensitized photovoltaic film, said bottom photocell converting the yellow, red and near infrared parts of the solar emission spectrum to drive the reduction of the protons, produced in the top photocell during the water oxidation process, said reduction of protons to hydrogen gas taking place in an electrolyte compartment mounted behind the bottom photocell and being separated from the top photocell compartment where oxygen is evolved by a glass frit or an ion conducting membrane.

3. A photoelectrochemical system according to claim 1, characterized in that the photoactive oxide material present in the top cell is a doped form of $Fe_2O_3$, the dopant being selected from the elements Si, Ge, Sn, Pb, Ti, Zr, Hf, Sb, Bi, V, Nb, Ta, Mo, Tc and Re or F, Cl, Br and I.

4. A photoelectrochemical system according to claim 1, characterized in that a photoactive $Fe_2O_3$ in doped or undoped form is present as a smooth layer, said layer having a thickness between 50 nm and 5000 nm, said layer transmitting light of wavelength above 600 nm.

5. A photoelectrochemical system according to claim 1, characterized in that the sensitizer is a ruthenium polypyridyl complex chosen from $RuL_2(NCS)_2$ and $RuL'(NCS)_3$, where L=4,4'-dicarboxy-2,2'-bipyridine and L'=4,4'4"-tricarboxy-2,2',6',2"-terpyridine.

6. A photoelectrochemical system according to claim 1, characterized in that the oxygen and hydrogen evolution reaction take place both in the top cell and/or in separated compartments, said compartments being connected by an ion conducting membrane or a glass frit.

7. A photoelectrochemical system according to claim 1, characterized in that the hydrogen evolution is catalyzed by a metal, chosen from Ni, Pt, Pd, Ru, Rh and Ir, or alternatively by a polyacid or heteropolyacid chosen from tungsten, vanadium and molybdenum, said catalyst being deposited in the form of a thin coating on the cathode of the cell.

8. A photoelectrochemical system according to claim 1, characterized in that seawater is used as a source for hydrogen and oxygen in a water cleavage or water splitting device.

* * * * *